United States Patent
Lai

(12) 
(10) Patent No.: US 6,308,236 B1
(45) Date of Patent: Oct. 23, 2001

(54) LOCAL BUS WITH DYNAMIC DECODING CAPABILITY

(75) Inventor: Jiin Lai, Cupertino, CA (US)

(73) Assignee: VIA Technologies, Inc., Taipei (TW)

( * ) Notice: Subject to any disclaimer, the term of this patent is extended or adjusted under 35 U.S.C. 154(b) by 0 days.

(21) Appl. No.: 08/498,183

(22) Filed: Jul. 5, 1995

(51) Int. Cl.[7] .................................................. G06F 13/14
(52) U.S. Cl. .............................................................. 710/129
(58) Field of Search ................................... 395/309, 821; 710/126, 129, 128, 107, 109, 35

(56) References Cited

U.S. PATENT DOCUMENTS

| | | | |
|---|---|---|---|
| 5,045,998 | * | 9/1991 | Begun et al. .......................... 364/200 |
| 5,325,499 | * | 6/1994 | Kummer et al. ....................... 395/425 |
| 5,333,276 | * | 7/1994 | Solari .................................... 712/220 |

* cited by examiner

*Primary Examiner*—Glenn A. Auve
(74) *Attorney, Agent, or Firm*—Fish & Richardson P.C.

(57) ABSTRACT

The invention monitors the CPU cycle accessing the local bus device and records the address in its internal buffers. For any cycle addressed within a predetermined page of that address, the invention first stores the data into post-write buffer and thereafter immediately responds with READY signal to terminate the CPU cycle. For cycle addressed out of the predetermined page, this cycle would not have benefit from the post-write buffer and this new address value is recorded as a result and a new page is redefined dynamically if the address is responded by a local-bus device. The address page is dynamically defined at all time to meet the current behavior of the program running. Though a page miss could happen, however, the performance degradation is a minimal.

4 Claims, 4 Drawing Sheets

LOCAL BUS WITH DYNAMIC DECODING CAPABILITY

TECHNICAL FIELD OF INVENTION

The invention relates to the address decoding scheme and, in particular, to dynamic address decoding scheme of a local bus within a computer system.

BACKGROUND OF THE INVENTION

The introduction of high speed local bus has greatly improved the performance of the peripheral devices as compared to the traditional expansion bus.

As shown in FIG. 1, a typical computer system includes multiple hierarchical bus interfaces The one closest to CPU is the CPU bus and the one behind the bridge device is the local bus which runs at high speed with very high transfer rate between the CPU and high speed peripherals, such as graphics, video and disk device. The last one is the expansion bus including well known ISA, EISA or micro-channel bus.

The access to the peripheral devices by the CPU starts as CPU asserts address/data start (ADS) signal and the access is completed successfully as the associated controller asserts a READY signal to the CPU. The performance of the computer system is measured by the speed of which the system responds with the READY signal.

A CPU cycle could be addressed to the devices on any one of the three buses which are organized in a hierarchical architecture. If devices on the CPU bus, e.g. cache or memory, is addressed, CPU bus responds first. To the next level, CPU bus cycles are required to translate the CPU cycle into the local bus cycle. After a predetermined amount of time, if no device on the local bus responds, the cycle will be further passed to the expansion bus. The completion of the expansion bus cycle is indicated by the READY signal generated by the shown system chipset. The latency from the start of ADS signal of CPU to the assertion of READY signal by the associated controller includes time overhead of bus cycle conversion by the bridge device and the time overhead spent on receipt of the acknowledgement from local bus device when no post-write buffers are provided.

It is well known that the bridge device has built-in post-write buffers for speeding up the write cycle operation. The post-write buffers technique employed requires, before hand, the knowledge of addressing range of the peripheral devices under the bus. As such, the buffer manager device then may actively respond to an access request without actually obtaining the assertion of the peripheral devices.

The mechanism of the post-write buffers involves the temporary storage of the data into the buffers and immediate response to the CPU with READY signal thereafter without actual acknowledgement from the local bus device. Accordingly, CPU is allowed to proceed next cycle in concurrence with the local bus cycle completing the operation of the data, stored within the post-write buffer, in connection with the associated local bus device.

In any way, the bridge device should not acknowledge the CPU cycle with the READY signal unless it knows the CPU cycle is addressed to the device on the local bus. Furthermore, if, before hand, the CPU cycle could not be recognized as being addressed to the device on the local bus, the post-write buffers, though provided in the bridge device, are useless. Therefore, the key to use the provided post-write buffers is the before-hand knowledge of the bridge device over the CPU cycle addressing the device on the local bus.

One conventional approach, called static window, is provided for fully taking advantage of the post-write buffers. The system software, e.g. BIOS or OS, must first program the address windows, which is responded by the local bus devices, into the bridge device. The bridge device then decodes the CPU cycle and determines if the address of the cycle falls within any of the windows.

This approach has several inherent disadvantages. First of all, there is no way for system software to know the address ranges of all devices sold in the marketplace and compatibility is a issue. Second, the approach might rely on end-user's knowledge to program new address windows into the bridge device when a new local bus device is first installed. It is quite unacceptable since the general end-user has no such technical background. Third, the number of local bus device to be placed on the local bus is uncertain and varies among different users and it is difficult to know how many address windows will be actually required.

To overcome the deficiency of the conventional approach, it is the main objective of the invention to use the post-write buffers with simplification of BIOS or OS support.

SUMMARY OF THE INVENTION

The invention provided includes a dynamic decoding device, a local bus interface device, a First-In-First-Out data buffer and an acknowledge generator.

The dynamic decoding device is coupled to the CPU address lines and generates a HIT signal when an address value on the CPU address lines of the present CPU cycle falls within a predetermined range of a previous address value of a previous CPU cycle. The previous address value was stored in the register within the dynamic decoding device.

The local bus interface device is coupled to the local bus, and it triggers a local bus cycle on the local bus and generates an acknowledge signal when the address value of the present CPU cycle does not fall within the predetermined range of the previous address value of the previous CPU cycle which is indicated by the inactive status of HIT signal. And, in response to the HIT signal, the local bus interface device generates a plurality of control signals to the local bus.

The First-In-First-Out data buffer is coupled to the CPU data lines and the local bus, and transmits data from the CPU data bus to local bus under the control of the plurality of control signals.

The acknowledgement generator, responsive to the HIT signal, generates a READY signal to the CPU.

DETAILED DESCRIPTION OF THE INVENTION

Figure 1:
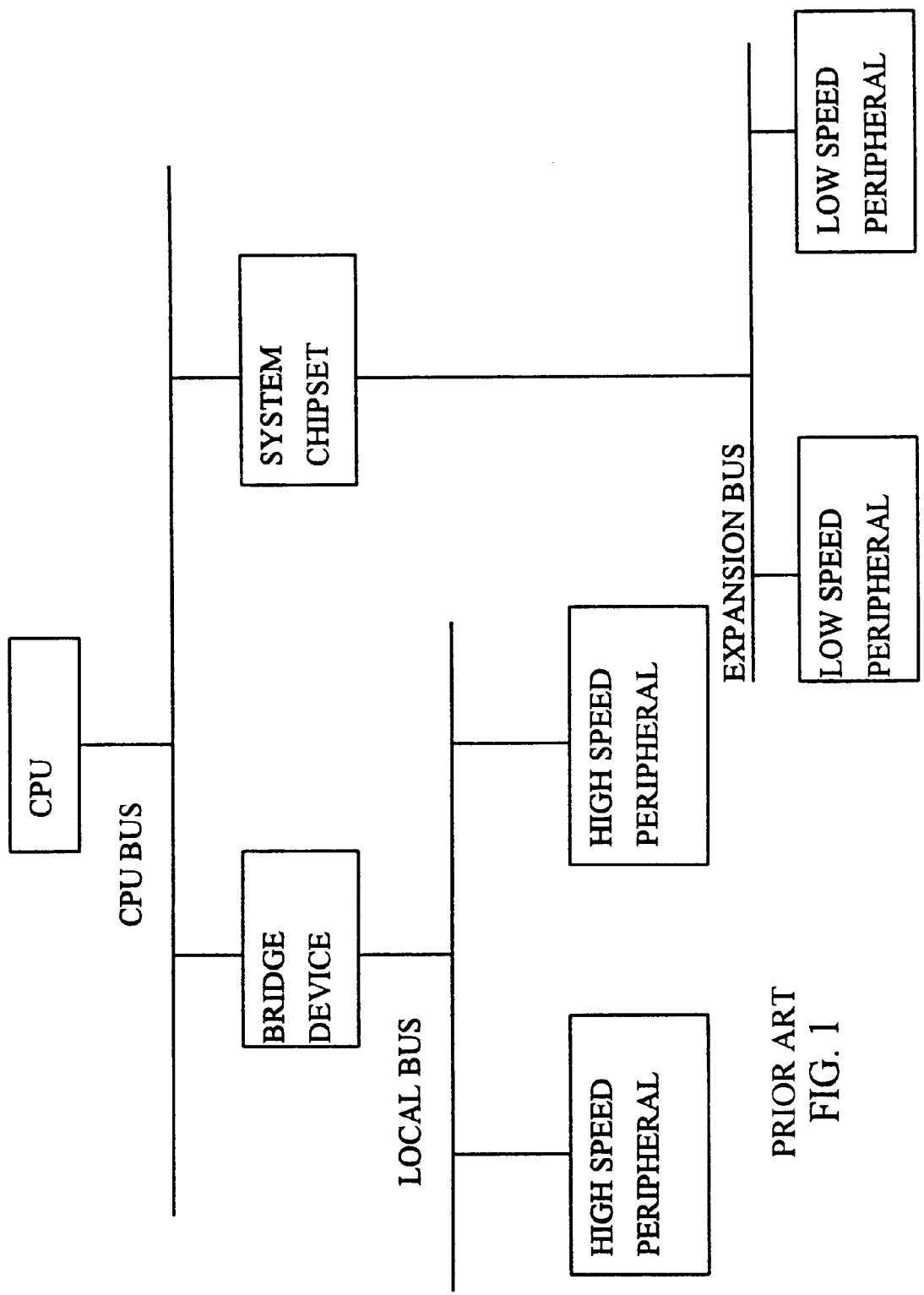
FIG. 1 shows a typical computer system.
Figure 2:
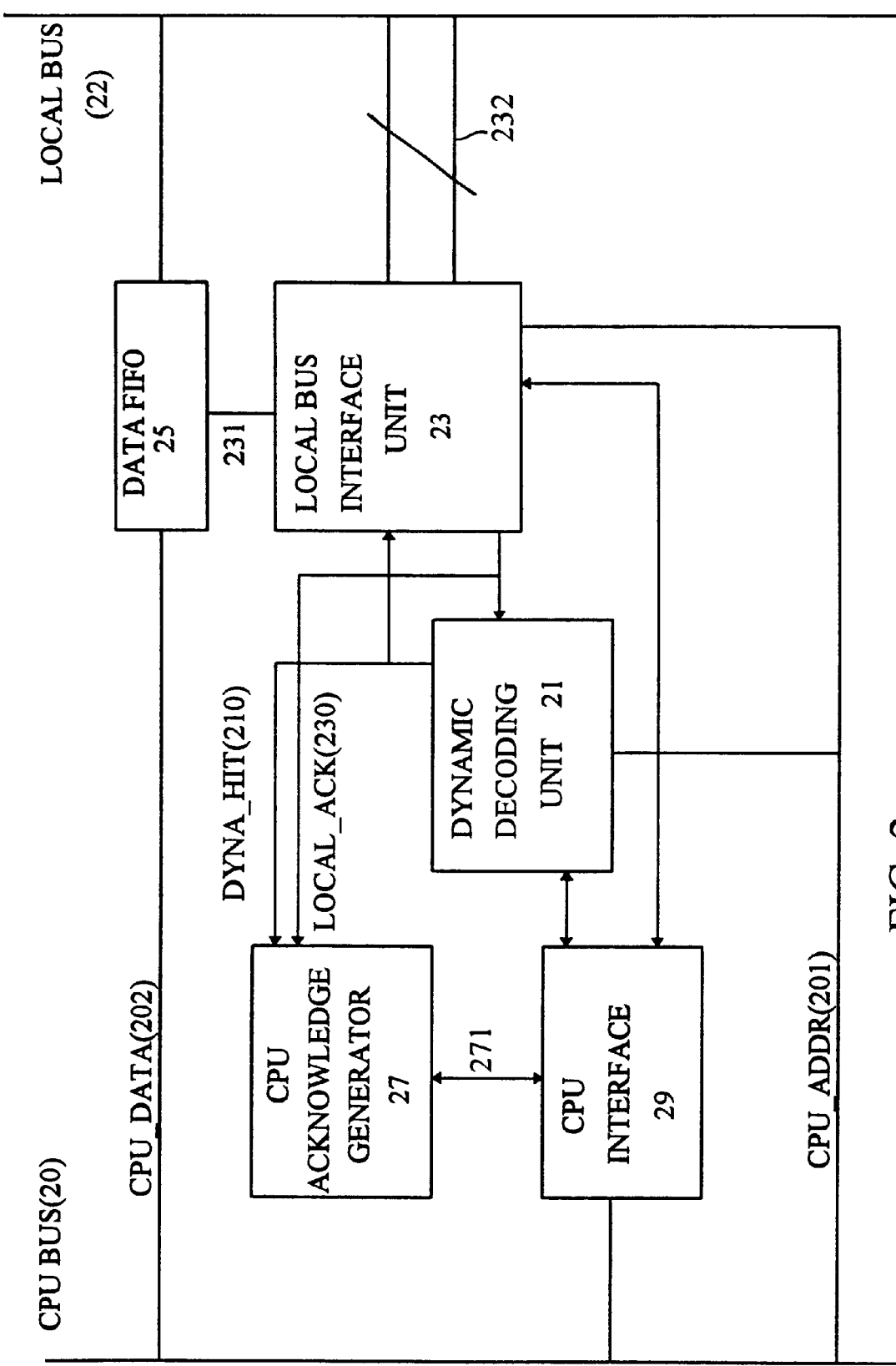
FIG. 2 shows the invention in block forms.

Referring to FIG. 2, the invention provided includes a dynamic decoding device 21, a local bus interface device 23, a First-In-First-Out data buffer 25 and an acknowledge generator 27.

The dynamic decoding device 21 is coupled to the CPU address lines 201 and generates a HIT signal 210 when an address value on the CPU address lines 210 of the present CPU cycle falls within a predetermined range of a previous address value of a previous CPU cycle. The previous address value was stored in the register within the dynamical decoding device 21 which will be further recited hereinafter.

The local bus interface device 23 is coupled to the local bus 22, and triggers a local bus cycle on the local bus 22 and generates an acknowledge signal 230 when the address value of the present CPU cycle does not fall within the predetermined range of the previous address value of the previous CPU cycle which is indicated by the inactive status of HIT signal 210. And, in response to the HIT signal 210, the local bus interface device 23 generates a plurality of control signals 232 to the local bus 22.

The First-In-First-Out data buffer 25 is coupled to the CPU data lines 202 and the local bus 22 and transmits data from the CPU data lines 202 to local bus 22 under the control of a plurality of control signals 231.

The acknowledge generator 27, responsive to the HIT signal 210, generates a READY signal 271 to the CPU.

Figure 3:
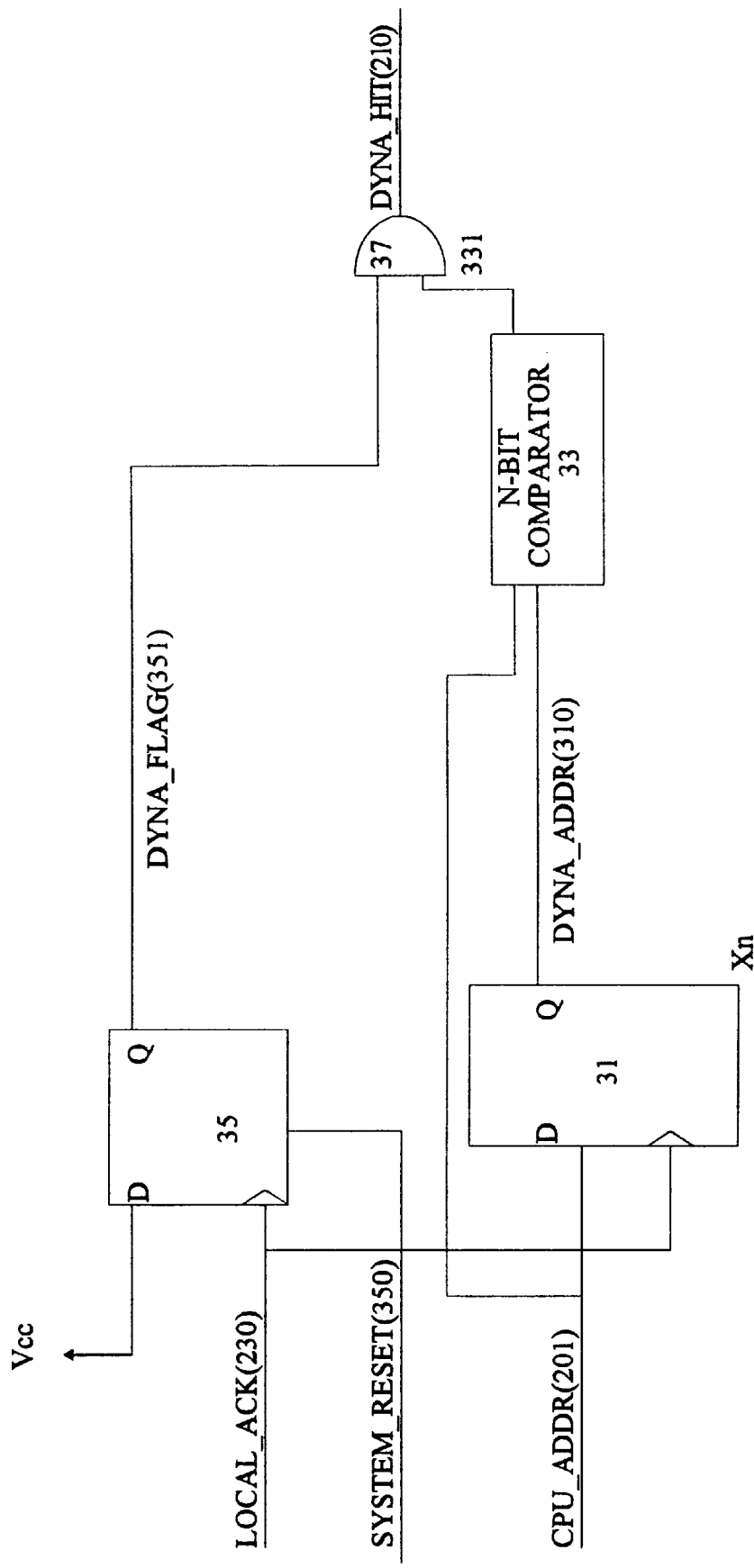
FIG. 3 shows the dynamic decoding device of the invention in details.

As shown in FIG. 3, the dynamical decoding device 21 has a register Xn made of a plurality of flip-flops 31 each of which has an output 310. The new address is recorded only if the address is responded by a local-bus device. Responsive to the local-bus acknowledge signal 230, the register Xn latches and stores the address value on the CPU address line 201 when the address value of the present CPU cycle does not fall within the predetermined range of the previous address value of the previous CPU cycle on the output 310 which accesses the local-bus device.

The dynamical decoding device 21 has a comparator 33, coupled to the CPU address lines 201 and the output 310 of the register Xn respectively, and determines whether the address value 201 of the present CPU cycle falls within the predetermined range of the previous address value of the previous CPU cycle on output 310 which accesses the local-bus device.

The flip-flop 35 and AND gate 37 are used to disable the function of the invention at the power-on of the system. After the power-on, the system reset signal 350 is active to set the flag signal 351 to be zero which prohibits the output 331 being placed on signal line 210. When the CPU starts a cycle and a local bus responds thereto indicated by the active acknowledge signal 230, the address value on the CPU address line 201 is then latched into the register Xn, responsive to the acknowledge signal 230. At the same time, the logic 1 value at D input of flip-flop 35 is output to the signal line 351 allowing the transmission of the signal 331 to the HIT signal line 210 for the following cycles.

Figure 4:
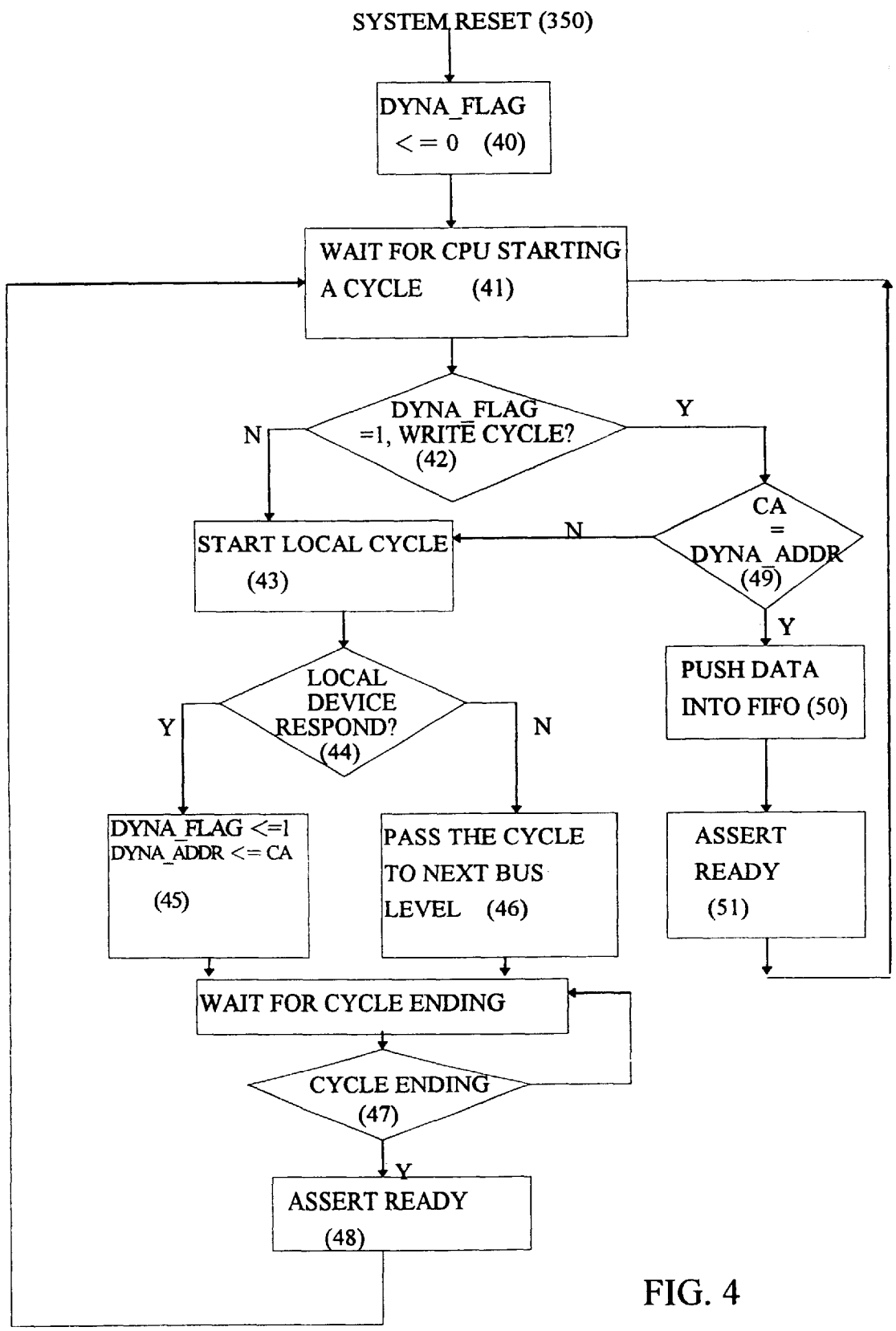
FIG. 4 shows the steps involved within the computer system implementing the invention.

The invention may be further understood by referring to the steps, disclosed in FIG. 4, performed by the computer system implementing the invention.

After the system reset signal 350 comes in, the flag signal is set zero by. In step 41, to wait for a CPU cycle. In step 42, test if flag signal is 1 and if the coming CPU cycle is a write cycle. If it is no in step 42, in step 43, the local bus interface device 23 starts a corresponding local bus cycle. If it is yes in step 42, in step 49, test if signal 201 equals to signal 310. Following the step 43, test if an acknowledge signal 230 is generated by a local bus device in step 44. If it is yes in step 44, flag signal 351 is set logic 1 and the present value on CPU address lines 210 is latched into the register Xn in step 45. If it is no in step 44, the system passes the CPU cycle to the next level of the bus in step 46. In step 47, test if the cycle is completed by the device. If it is completed, in step 48, assert a READY signal 271 either by device of local bus or next level bus. If signal 201 equals signal 310, in step 50 enable the FIFO data buffer 25 and push the data into the FIFO data buffer 25 in step 50. Thereafter, in step 51, assert a READY signal 271.

As shown in FIG. 3, the number n of the flip-flop required for this invention depends on the bit width M of the CPU address bus and page size P we want. To be specific, $n = M - \log_2 P$. For instance, in a 32 bit address system and page size is chosen to be 1K, n would be 32–10, or 22. Accordingly, the address lines to be coupled to the register Xn are from A10 through A31.

In summary, the invention monitors the CPU cycle accessing the local bus device and records the address in its internal buffers. For any cycle addressed within a predetermined page of that address, the invention first stores the data into post-write buffer and thereafter immediately responds with READY signal to terminate the CPU cycle. For cycle addressed out of the predetermined page, this cycle would not have benefit from the post-write buffer, and this new address value will be recorded and a new page is redefined if the address is responded by a local-bus device. The address page is dynamically defined to meet the current behavior of the program running. Though a page miss could happen, however, the performance degradation is a minimal.

From above recitations, it is easily to note the system software does not have to program the address page into the bridge device any more and the invention is totally transparent to the end users and system software.

What is claimed is:

1. An interface device between a CPU bus and a local bus, the CPU bus having CPU address lines and data lines, comprising:

a dynamic decoding means, coupled to the CPU address lines, for generating a HIT signal when an address value of a present CPU cycle falls within a predetermined range of a previous address value of a previous CPU cycle accessing a local-bus device;

a local bus interface means, coupled to the local bus, for triggering a local bus cycle and generating an acknowledge signal when the address value of the present CPU cycle does not fall within the predetermined range of the previous address value of the previous CPU cycle, and, in response to the HIT signal, for generating a first plurality of control signals to the local bus;

a First-In-First-Out data buffer, coupled to the CPU data lines and the local bus, for transmitting data within the data buffer to the local bus under the control of a second plurality of control signals;

an acknowledgement generator, responsive to the HIT signal, for generating a READY signal;

wherein the dynamic decoding means has a register with an output, responsive to the acknowledge signal, for storing the address value when the address value of the present CPU cycle does not fall within the predetermined range of the previous address value of the previous CPU cycle accessing the local-bus device.

2. The interface device as recited in claim 1, wherein the dynamic decoding means having a comparator, coupled to the CPU address lines and the output of the register respectively, for determining whether the address value of the present CPU cycle falls within the predetermined range of the previous address value of the previous CPU cycle.

3. An interface device between a CPU bus and a local bus, the CPU bus having CPU address lines and data lines, comprising:

a dynamic decoding device, coupled to the CPU address lines, which generates a HIT signal when an address value of a present CPU cycle falls within a predetermined range of a previous address value of a previous CPU cycle accessing a local-bus device;

a local bus interface device, coupled to the local bus, which triggers a local bus cycle and generates an acknowledge signal when the address value of the present CPU cycle does not fall within the predetermined range of the previous address value of the previous CPU cycle, and, in response to the HIT signal, generates a first plurality of control signals to the local bus;

a First-In-First-Out data buffer, coupled to the CPU data lines and the local bus, for transmitting data within the data buffer to the local bus under the control of a second plurality of control signals;

an acknowledgement generator, responsive to the HIT signal, for generating a READY signal;

wherein the dynamic decoding device has a register with an output, responsive to the acknowledge signal, for storing the address value when the address value of the present CPU cycle does not fall within the predetermined range of the previous address value of the previous CPU cycle accessing the local-bus device.

4. The interface device as recited in claim 3, wherein the dynamic decoding device has a comparator, coupled to the CPU address lines and the output of the register respectively, for determining whether the address value of the present CPU cycle falls within the predetermined range of the previous address value of the previous CPU cycle.

* * * * *